United States Patent
Sashihara

(10) Patent No.: US 6,707,470 B1
(45) Date of Patent: Mar. 16, 2004

(54) APPARATUS FOR AND METHOD OF GATHERING INFORMATION, WHICH CAN AUTOMATICALLY OBTAIN HTML FILE OF URL EVEN IF USER DOES NOT SPECIFY URL

(75) Inventor: Toshiyuki Sashihara, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/566,466

(22) Filed: May 8, 2000

(30) Foreign Application Priority Data

May 21, 1999 (JP) .......................................... 11/141157

(51) Int. Cl.[7] .......................... G06F 3/00; G06F 15/177
(52) U.S. Cl. ...................... 345/745; 345/748; 345/744; 345/811; 709/229; 709/217
(58) Field of Search ................................ 345/745, 747, 345/744, 760, 740, 741, 854, 738, 748, 811, 812, 866; 709/201–203, 217, 229, 219, 213, 216; 707/501.1, 10; 715/501.1

(56) References Cited

U.S. PATENT DOCUMENTS

| | | | |
|---|---|---|---|
| 5,727,129 A | * | 3/1998 | Barrett et al. ........... 345/854 X |
| 5,960,429 A | * | 9/1999 | Peercy et al. ........... 345/760 X |
| 6,012,087 A | * | 1/2000 | Freivald et al. ......... 709/201 X |
| 6,195,679 B1 | * | 2/2001 | Bauersfeld et al. ......... 709/203 |
| 6,385,619 B1 | * | 5/2002 | Eichstaedt et al. ........ 707/10 X |
| 2002/0178232 A1 | * | 11/2002 | Ferguson ..................... 709/226 |
| 2003/0037143 A1 | * | 2/2003 | Kapoor ........................ 709/217 |

FOREIGN PATENT DOCUMENTS

| | | |
|---|---|---|
| JP | 10143529 | 5/1998 |
| JP | 10222541 | 8/1998 |
| JP | 1124982 | 1/1999 |
| JP | 1125104 | 1/1999 |

OTHER PUBLICATIONS

Japanese Office Action issued Dec. 9, 2003 (w/English translation of relevant portion).

* cited by examiner

Primary Examiner—Raymond J. Bayerl
(74) Attorney, Agent, or Firm—Dickstein, Shapiro, Morin & Oshinsky, LLP.

(57) ABSTRACT

An information gathering apparatus includes a history memory unit, an assigning unit, a requiring unit, and an HTML obtaining unit. The history memory unit stores a plurality of specific URL (Uniform Resource Locator) data specified to be browsed, as a browsing history data. The assigning unit assigns priorities to the plurality of specific URL data based on the browsing history data. The requiring unit generates a request to obtain a HTML (Hyper Text Markup Language) file of the specific URL data to which the highest-priority is assigned by the assigning unit. The HTML obtaining unit obtains the HTML file corresponding to the request from a WWW (World Wide Web) server in response to the request.

10 Claims, 5 Drawing Sheets

DIFFERENCE BASED ON
THE FACT THAT WHICH DAY OF
A WEEK IT IS [DAY]

DIFFERENCE BETWEEN THE DAY
AND THE PRESENT DAY [DAY]

APPARATUS FOR AND METHOD OF GATHERING INFORMATION, WHICH CAN AUTOMATICALLY OBTAIN HTML FILE OF URL EVEN IF USER DOES NOT SPECIFY URL

BACKGROUND OF THE INVENTION

1. Field of the Invention

The present invention relates to an apparatus for and method of gathering information, and more particularly relates to an apparatus for and method of gathering information from the WWW (World Wide Web).

2. Description of the Related Art

If a file described in HTML (Hyper Text Markup Language) is obtained by a client terminal from the WWW, it is typically obtained by directly specifying, with an input unit of the client terminal a URL (Uniform Resource Locator) of the HTML file which a user desires to obtain. The URL is intended to specify data on the Web by specifying a protocol for a data transfer, a server name, a directory name and a file name.

However, a certain time is needed in order to obtain the HTML file. Thus, it is needed that an information gathering apparatus automatically obtain s the HTML file without the direct operation of a user such that the reduction of a waiting time in the user is realized.

As an example to cope with the request, for example, Japanese Laid Open Patent Application (JP-A-Heisei, 10-143529) proposes a scheme that a user presets an HTML file to be obtained and a time for the HTML file to be obtained and then obtains the HTML file at the preset time.

However, in the above-mentioned conventional technique, it is necessary to preset a schedule in which the URL to be automatically obtained by the user and the time to be obtained is specified. Today, an information gathering apparatus is typically used for automatically obtaining the HTML file. Thus, it is desirable that without the user's presetting, the HTML file desired by the user is automatically obtained in a background which can not be directly viewed from the user side.

For example, Japanese Laid Open Patent Application (JP-A-Heisei, 11-24982) discloses the following scheme, in order to display the newest Web page at a high speed and reserve an excellent response of a WWW browser. That is, it is provided with: a link table for maintaining a link destination list of a Web page together with a selection frequency, in accordance with a previous history; a table update device for updating a content of the link table when a link is selected; and a page pre-reader for pre-reading a data of URL in which a previous selection frequency is high, in accordance with the content of the link table. Then, a page having a high selection possibility is read into a cache area in advance.

Japanese Laid Open Patent Application (JP-A-Heisei, 10-222541) discloses an apparatus for and a method of pre-loading a web page corresponding to a link specified in HTML as follows. A web browser loads and displays a web page, and reads HTML of this web page, and then identifies an entry of a link marked as a target for the pre-load. Next, the web browser automatically pre-loads another HTML corresponding to the link and a related graphic file to a memory. This automatic pre-load is executed even if a user of the web browser does not select the link. If the user selects its link in succession, the corresponding HTML and the related graphic file can be used from a local memory. Accordingly, a delay in receiving the HTML and the related graphic file become small.

Japanese Laid Open Patent Application (JP-A-Heisei, 11-25104) discloses the following information processor. In a process for retrieving in turn the hierarchical pages such as a WWW browser and the like, an anchor retrieval device retrieves a first non-read anchor by using an instruction from a circle browsing instructor as a trigger. Then, it is controlled so as to access a hyper text of a network at a link destination if there is the non-read anchor and to return back to an original page if there is not the non-read anchor.

SUMMARY OF THE INVENTION

The present invention has been made to solve the above-described problems of the conventional information gathering apparatus. An object of the present invention is to provide an information gathering apparatus which automatically selects URL from a previous browsing history even if a user does not specify the URL and automatically obtains an HTML file of the thus-obtained URL.

In order to achieve an aspect of the present invention, an information gathering apparatus, includes: a history memory unit storing a plurality of specific URL (Uniform Resource Locator) data specified to be browsed, as a browsing history data; an assigning unit assigning priorities to the plurality of specific URL data based on the browsing history data; a requiring unit generating a request to obtain a HTML (Hyper Text Markup Language) file of the specific URL data to which the highest-priority is assigned by the assigning unit; and an HTML obtaining unit obtaining the HTML file corresponding to the request from a WWW (World Wide Web) server in response to the request.

In this case, the requiring unit generates the request at a predetermined time automatically.

Also in this case, the history memory unit stores as the browsing history data a time data indicating a date and time when each of the plurality of specific URL data is specified, in addition to the plurality of specific URL data.

Further in this case, an information gathering apparatus, further includes: a monitoring unit monitoring a state of a radio channel used for a connection to the Internet to generate a monitoring result, and wherein the requiring unit generates the request based on the monitoring result.

In this case, an information gathering apparatus, further includes: a checking unit checking a state of a communication band between the HTML obtaining unit and the WWW server to generate a checking result, and wherein the requiring unit generates the request based on the checking result.

Also in this case, an information gathering apparatus, further includes: a storing unit storing the HTML file obtained by the HTML obtaining unit and a creation data indicating a date and time on which the obtained HTML file is created, and wherein the HTML obtaining unit judges whether or not the HTML file corresponding to the request is stored in the storing unit before obtaining the HTML file corresponding to the request from the WWW server, and when the HTML obtaining unit judges the HTML file corresponding to the request is stored in the storing unit, the HTML obtaining unit checks the creation data of the HTML file corresponding to the request stored in the storing unit to require the WWW server to send a HTML file corresponding to the request of a creation date newer than the checked creation date to the HTML obtaining unit if the WWW server has the HTML file corresponding to the request of the creation date newer than the checked creation date, and wherein the storing unit stores the sent HTML file and the creation data of the sent HTML file.

Further in this case, the history memory unit stores as the browsing history data a period data indicating a time that elapsed after a first URL data of the plurality of specific URL data is specified before a second URL data of the plurality of specific URL data is specified subsequently to the first URL data, in addition to the plurality of specific URL data.

In this case, the history memory unit stores as the browsing history data a number data indicating the number of characters in the HTML file of each of the plurality of specific URL data, in addition to the plurality of specific URL data and the period data.

Also in this case, the history memory unit stores as the browsing history data an update time data indicating a time that elapsed before the HTML file of each of the plurality of specific URL data is updated, in addition to the plurality of specific URL and the time data.

Further in this case, if each of the plurality of specific URL data is browsed n (n is a positive integer) times, the assigning unit searches for a day on which the each specific URL data is browsed of a week each time of the n times and detects a different period indicating a difference between the searched day and a day corresponding to the predetermined time and determines an evaluation value corresponding to the each specific URL data based on the different periods corresponding to the n times of the each specific URL data, and gives a higher priority to the specific URL data having one of a larger value and a smaller value as the evaluation value when assigning the priorities to the plurality of specific URL data.

In this case, if each of the plurality of specific URL data is browsed m (m is a positive integer) times, the assigning unit detects a different time indicating a difference between a present time and a time corresponding to the time data each time of the m times and determines an evaluation value corresponding to the each specific URL data based on the different times corresponding to the m times of the each specific URL data, and gives a higher priority to the specific URL data having one of a larger value and a smaller value as the evaluation value when assigning the priorities to the plurality of specific URL data.

In order to achieve another aspect of the present invention, an information gathering method, includes: (a) storing a plurality of specific URL (Uniform Resource Locator) data specified to be browsed, as a browsing history data; (b) assigning priorities to the plurality of specific URL data based on the browsing history data; (c) generating a request to obtain a HTML (Hyper Text Markup Language) file of the specific URL data to which the highest-priority is assigned as the result of the (b) step; and (d) obtaining the HTML file corresponding to the request in response to the request.

In this case, the (c) step includes generating the request at a predetermined time automatically.

Also in this case, the (a) step includes storing as the browsing history data a time data indicating a date and time when each of the plurality of specific URL data is specified, in addition to the plurality of specific URL data.

Further in this case, an information gathering method, further includes: (e) monitoring a state of a radio channel used for a connection to the Internet to generate a monitoring result, and wherein the (c) step includes generating the request based on the monitoring result.

In this case, an information gathering method, further includes: (f) checking a state of a communication band used for a connection to a WWW server to generate a checking result, and wherein the (c) step includes generating the request based on the checking result.

Also in this case, an information gathering method, further includes: (g) storing in a storing unit the HTML file obtained as the result of the (d) step and a creation data indicating a date and time on which the obtained HTML file is created; (h) judging whether or not the HTML file corresponding to the request is stored in the storing unit before the (d) step is performed; (i) checking the creation data of the HTML file corresponding to the request stored in the storing unit when the HTML file corresponding to the request is judged to be stored in the storing unit as the result of the (h) step; and (j) requiring a WWW server to send a HTML file corresponding to the request of a creation date newer than the checked creation date if the WWW server has the HTML file corresponding to the request of the creation date newer than the checked creation date, and wherein the (g) step includes storing in the storing unit the sent HTML file and the creation data of the sent HTML file.

Further in this case, the (a) step includes storing as the browsing history data a period data indicating a time that elapsed after a first URL data of the plurality of specific URL data is specified before a second URL data of the plurality of specific URL data is specified subsequently to the first URL data, in addition to the plurality of specific URL data.

In this case, the (a) step includes storing as the browsing history data a number data indicating the number of characters in the HTML file of each of the plurality of specific URL data, in addition to the plurality of specific URL data and the period data.

Also in this case, the (a) step storing as the browsing history data an update time data indicating a time that elapsed before the HTML file of each of the plurality of specific URL data is updated, in addition to the plurality of specific URL and the time data.

Further in this case, if each of the plurality of specific URL data is browsed n (n is a positive integer) times, the (b) step includes searching for a day on which the each specific URL data is browsed of a week each time of the n times and detecting a different period indicating a difference between the searched day and a day corresponding to the predetermined time and determining an evaluation value corresponding to the each specific URL data based on the different periods corresponding to the n times of the each specific URL data, and giving a higher priority to the specific URL data having one of a larger value and a smaller value as the evaluation value.

In this case, if each of the plurality of specific URL data is browsed m (m is a positive integer) times, the (b) step includes detecting a different time indicating a difference between a present time and a time corresponding to the time data each time of the m times and determining an evaluation value corresponding to the each specific URL data based on the different times corresponding to the m times of the each specific URL data, and giving a higher priority to the specific URL data having one of a larger value and a smaller value as the evaluation value.

In order to achieve still another aspect of the present invention, a computer readable recording medium for recording a program for a process, includes: (a) storing a plurality of specific URL (Uniform Resource Locator) data specified to be browsed, as a browsing history data; (b) assigning priorities to the plurality of specific URL data based on the browsing history data; (c) generating a request to obtain a HTML (Hyper Text Markup Language) file of the specific URL data to which the highest-priority is assigned as the result of the (b) step; and (d) obtaining the HTML file corresponding to the request in response to the request.

In this case, a computer readable recording medium for recording a program for a process, further includes: (g) storing in a storing unit the HTML file obtained as the result of the (d) step and a creation data indicating a date and time on which the obtained HTML file is created; (h) judging whether or not the HTML file corresponding to the request is stored in the storing unit before the (d) step is performed; (i) checking the creation data of the HTML file corresponding to the request stored in the storing unit when the HTML file corresponding to the request is judged to be stored in the storing unit as the result of the (h) step; and (j) requiring a WWW server to send a HTML file corresponding to the request of a creation date newer than the checked creation date if the WWW server has the HTML file corresponding to the request of the creation date newer than the checked creation date, and wherein the (g) step includes storing in the storing unit the sent HTML file and the creation data of the sent HTML file.

The present invention achieving the above-mentioned object is characterized in that it comprises: a history memory that stores and keeps a URL information whose obtainment is required and a date and time information as an browsing history; an automatically requiring unit that obtains a URL in accordance with an browsing state from the history memory at a preset time, and then establishes a priority, and further requires to obtain an HTML file from the URL in an order starting from a URL having a higher priority; and an HTML obtaining unit that obtains the HTML file of the URL required by the automatically requiring unit from a WWW server, and then stores in the HTML memory.

BRIEF DESCRIPTION OF THE DRAWINGS

A more complete understanding of the teachings of the present invention may be acquired by referring to the accompanying figures, in which like reference numbers indicate like features and wherein.

DESCRIPTION OF THE PREFERRED EMBODIMENTS

Embodiments of the present invention will be described below with reference to the attached drawings.

Embodiments of the present invention will be described. The present invention selects an URL (Uniform Resource Locator) of an HTML (Hyper Text Markup Language) file, which a user frequently browses, among HTML files of the WWW (World Wide Web) from a previous browsing history. In the present invention, the HTML file of the selected URL is automatically downloaded. Thereby, a conventionally needed work is not needed in which the user presets the URL for the sake of the automatic downloading, and a waiting time is reduced.

Figure 1:
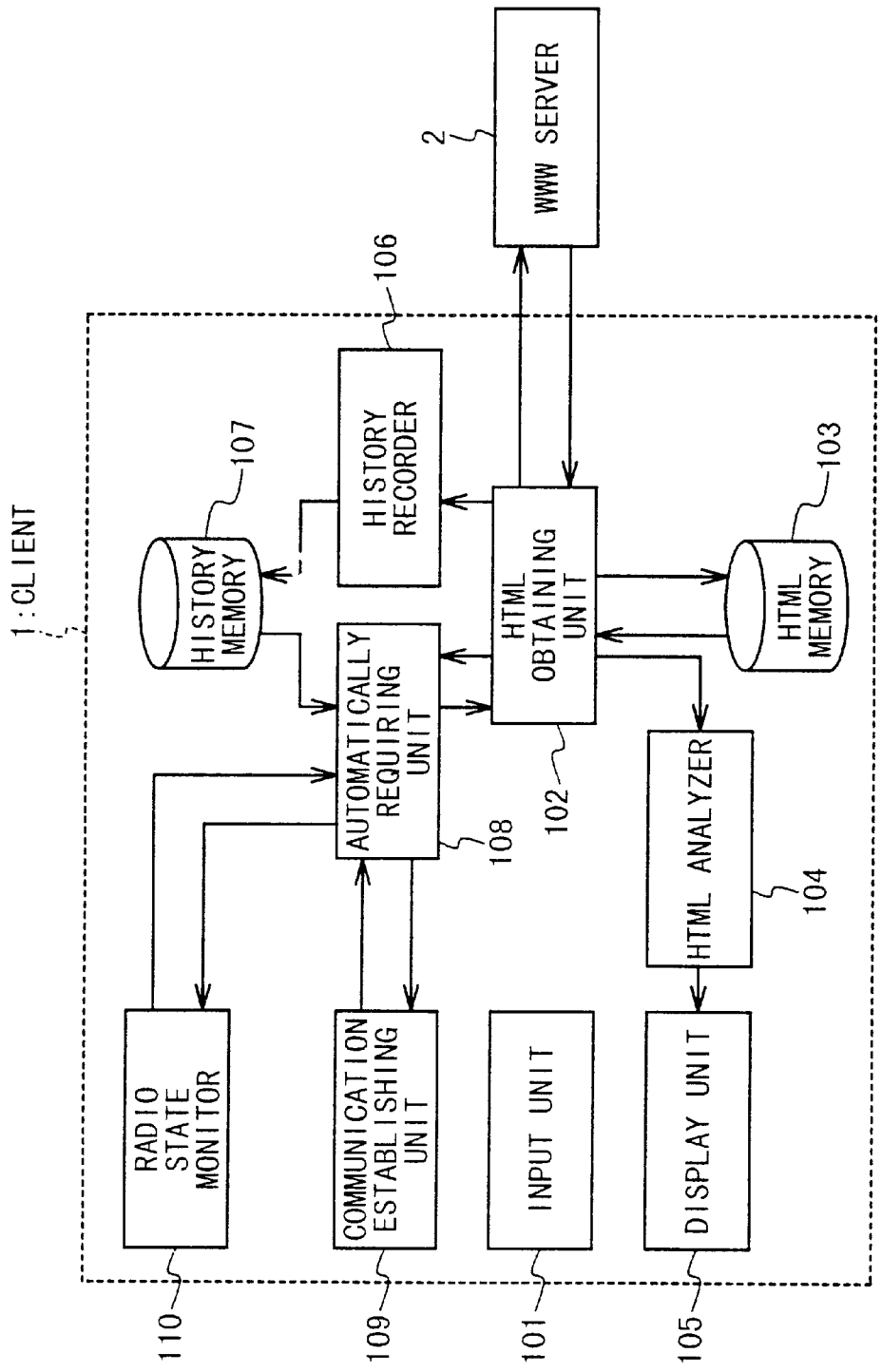
FIG. 1 is a view showing a configuration of a first embodiment of the present invention.

The embodiment of the present invention is described in detail. Referring to FIG. 1, in the preferred embodiment of the present invention, a client terminal (1) is connected to a WWW server (2). The client terminal (1) is provided with an input unit (101), an HTML obtaining unit (102), an HTML memory (103), a history memory (107) and an automatically requiring unit (108).

The input unit (101) inputs a predetermined time set by a user. The history memory (107) stores and maintains as a browsing history information of a URL required to be obtained and information of a date and time when the URL, is required.

The automatically requiring unit (108), at the predetermined time, refers to the history memory (107) to extract a plurality of URLs that the user frequently browses on the client terminal (1) based on the previous browsing history. The automatically requiring unit (108) assigns priorities to the plurality of URLs, and requires the HTML obtaining unit (102) to obtain an HTML file of a URL having the highest priority.

The HTML obtaining unit (102), when obtaining the HTML file of the required URL from the WWW server (2), stores it in the HTML memory (103), and then reports the completion of the obtaining to the automatically requiring unit (108). When the automatically requiring unit (108) receives the report of the completion, the automatically requiring unit (108) requires the HTML obtaining unit (102) to obtain an HTML file of a URL having the next highest priority.

The repetition of the above-mentioned process enables a waiting time in browsing the URL to be reduced without the preset of the URL which the user frequently browses, namely, the URL desired by the user.

In the embodiments of the present invention, the automatically requiring unit (108) and the HTML obtaining unit (102) carry out their functions and processes in accordance with a program executed on a computer in the client terminal (1). The client terminal (1) reads out the program from a computer-readable record medium for recording therein the program or from a communication medium for transmitting the program to execute.

The embodiments of the present invention will be described below with reference to the drawings, in order to explain the above-mentioned embodiments of the present invention in detail.

FIG. 1 is a view showing the configuration of a first embodiment of the present invention. Referring to FIG. 1, the first embodiment of the present invention is provided with a client 1 and a WWW server 2. The client 1 is provided with an input unit 101, an HTML obtaining unit 102, an HTML memory 103, an HTML analyzer 104, a display unit 105, a history recorder 106, a history memory 107, an automatically requiring unit 108, a communication establishing unit 109 and a radio state monitor 110.

The input unit 101 includes a keyboard, a mouse and the like, in order for the user to input an URL information and the like. The URL inputted from the input unit 101 is sent to the HTML obtaining unit 102.

The HTML obtaining unit 102 obtains from the WWW server 2 the HTML file of the URL required by the input unit 101 or the automatically requiring unit 108, and sends it to the HTML memory 103 and the HTML analyzer 104. The HTML obtaining unit 102 sends the required URL and the required date and time information to the history recorder 106.

The HTML memory 103 transiently records therein the HTML file sent from the HTML obtaining unit 102 and the date and time of the creation of the HTML file. The HTML analyzer 104 analyzes the HTML file received from the HTML obtaining unit 102 to convert into a form displayed on the display unit 105. The display unit 105 displays thereon the data converted by the HTML analyzer 104.

The history recorder 106 sends the required URL and the required date and time information received from the HTML obtaining unit 102 to the history memory 107. The history memory 107 records therein the required URL and the required date and time information sent from the history recorder 106.

The automatically requiring unit 108 selects the URL which the user frequently browses based on the browsing history obtained from the history memory 107, and requires the HTML obtaining unit 102 to obtain the selected URL, at the predetermined time inputted to the input unit 101 or at a timing determined based on the information from the radio state monitor 110.

The communication establishing unit 109, if a dialup connection is used for a connection to the Internet, establishes the connection. In response to a request from the automatically requiring unit 108, the communication establishing unit 109 starts a connection operation. The communication establishing unit 109 reports the completion to the automatically requiring unit 108 when the connection operation is completed.

The radio state monitor 110, if a radio communication is used for the connection to the Internet, monitors the state of radio wave, and reports the monitored result to the automatically requiring unit 108. The WWW server 2 sends a content of the file to the client 1, in response to a request of obtaining the HTML file outputted from the client 1.

Figure 2:
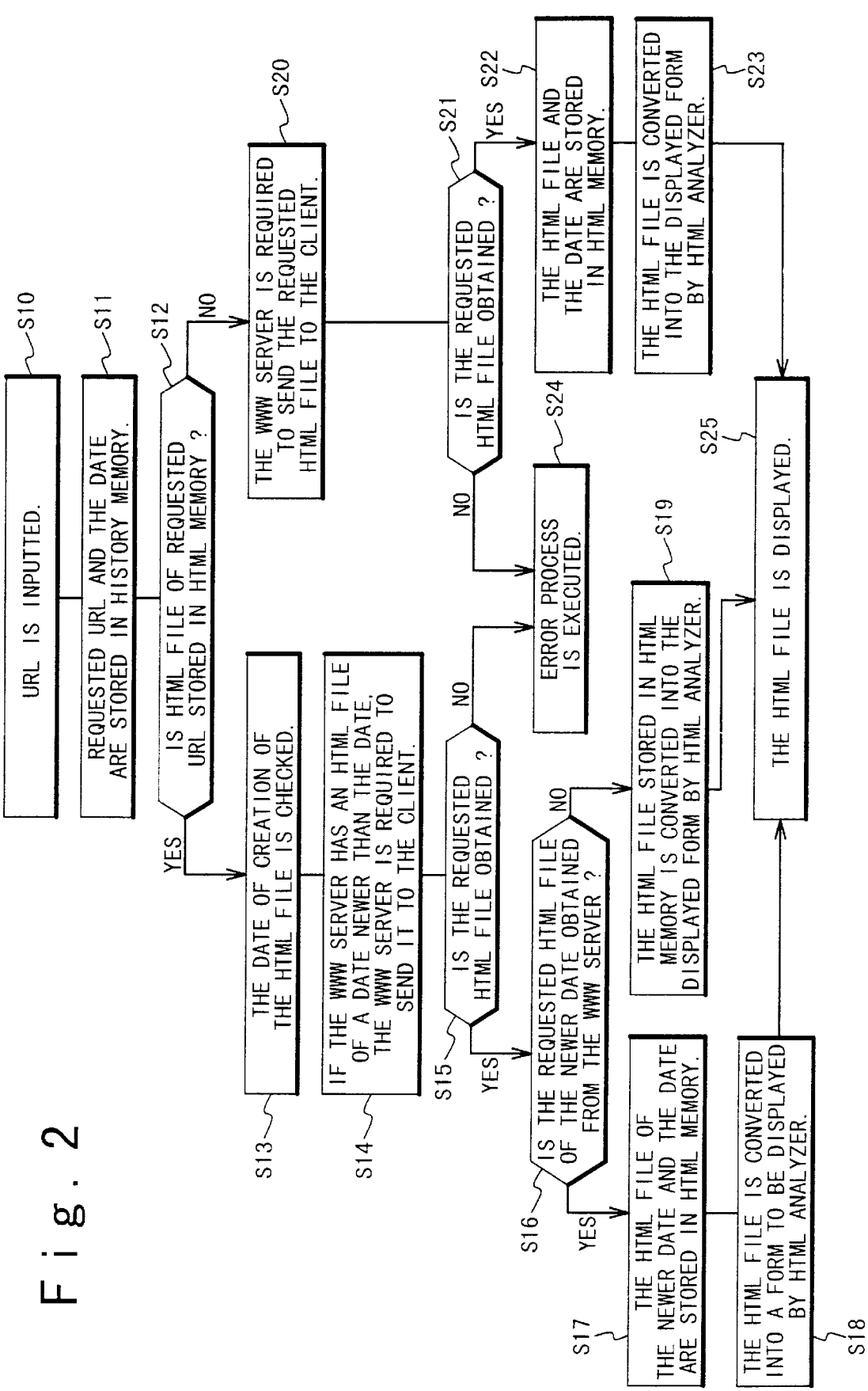
FIG. 2 is a flowchart showing a process of the first embodiment of the present invention.
Figure 3:
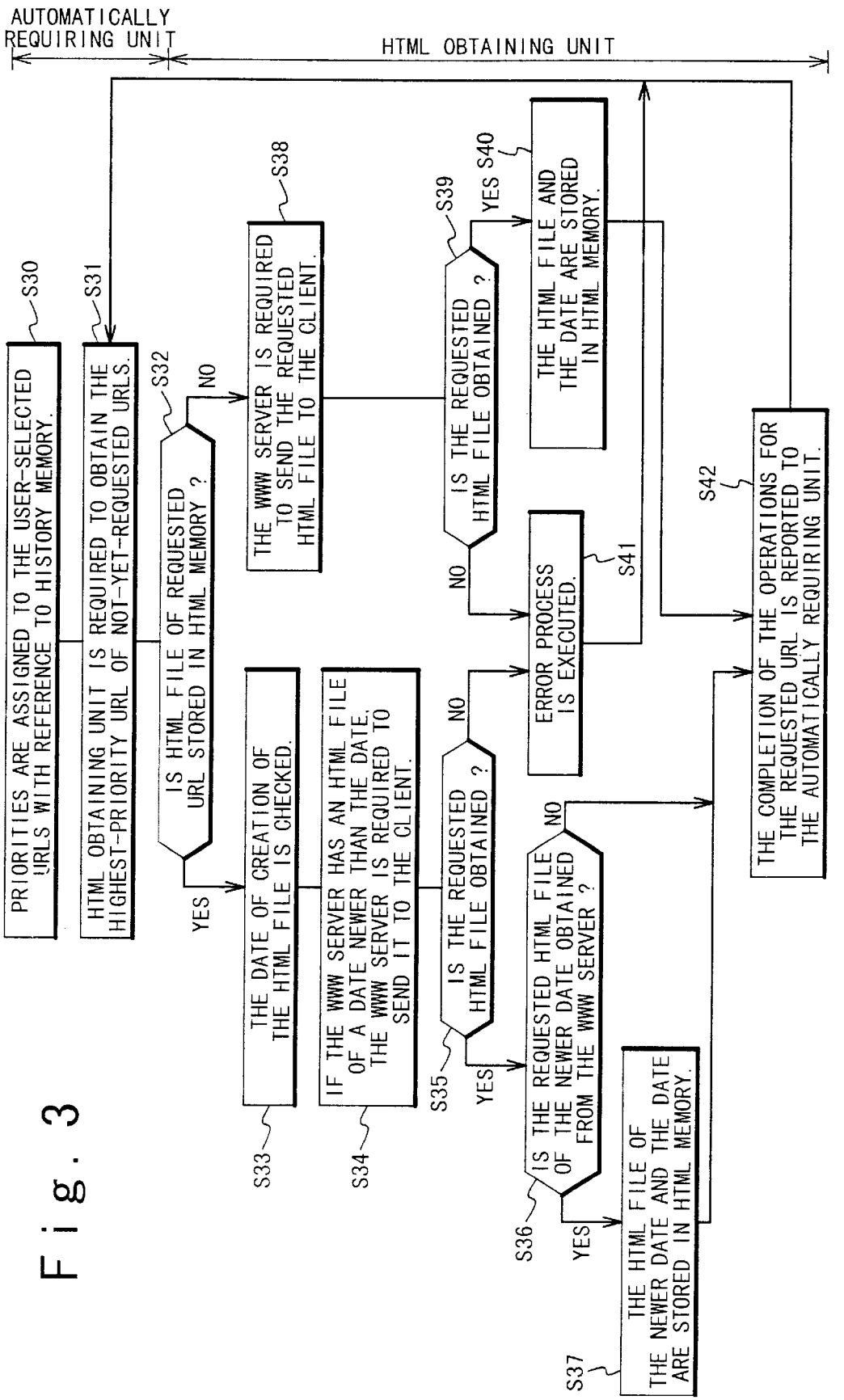
FIG. 3 is a flowchart showing another process of the first embodiment of the present invention.

FIGS. 2 and 3 are flowcharts showing a processing procedure of the embodiment of the present invention. The operation of the embodiment of the present invention will be described below with reference to FIGS. 1 and 2.

A case is firstly described in which a user directly obtains an HTML file. FIG. 2 is the flowchart showing this processing procedure.

When the user browses an HTML file of a certain URL, the user inputs the URL to the input unit 101 (Step S10) to require the HTML obtaining unit 102 to obtain the HTML file of the URL.

The HTML obtaining unit 102 firstly outputs the required URL and the required date and time to the history recorder 106 to require the history recorder 106 to record. The history recorder 106 stores the inputted URL and the inputted date and time in the history memory 107 in a moderate form (Step S11).

Next, the HTML obtaining unit 102 checks whether or not the HTML file of the required URL is stored in the HTML memory 103 (Step S12). If the HTML file exists in the HTML memory 103, the HTML obtaining unit 102 checks the date and time on which the HTML file was created (Step S13). The HTML obtaining unit 102 requires the WWW server 2 to send an HTML file of a date and time newer than the checked date and time to the HTML obtaining unit 102 if the WWW server 2 has the HTML file of the date and time newer than the checked date and time (Step S14).

If the HTML obtaining unit 102 can obtain the HTML file of the required URL (Step S15) and can also obtain the HTML file of the date and time newer than the checked date and time from the WWW server 2 (Step S16), the HTML obtaining unit 102 stores the obtained new HTML file together with the date and time of the creation of the obtained new HTML file in the HTML memory 103 (Step S17). The HTML obtaining unit 102 sends the obtained new HTML file to the HTML analyzer 104. The HTML analyzer 104 converts the obtained new HTML file into the form displayed on the display unit 105 (Step S18).

On the other hand, if the HTML file can not be obtained at the step S15, an error process is executed (Step S24). Again, the operational flow becomes in a state of waiting for a request from a user.

If the HTML file of the date and time newer than the checked date and time can not be obtained from the WWW server 2 at the step S16, the HTML file of the required URL stored in the HTML memory 103 is sent to the HTML analyzer 104. The HTML analyzer 104 converts the HTML file into the form displayed on the display unit 105 (Step S19).

If the HTML file of the required URL does not exist in the HTML memory 103 at the step S12, the HTML obtaining unit 102 requires the WWW server 2 to send the HTML file of the required URL to the HTML obtaining unit 102 without reservation(Step S20). The WWW server 2 sends the required HTML file to the HTML obtaining unit 102.

When the HTML obtaining unit 102 can obtain the HTML file of the required URL, from the WWW server 2 (Step S21 ; Yes), the HTML obtaining unit 102 stores the obtained HTML file together with the date and time of the creation of the obtained HTML file in the HTML memory 103 (Step 522). The HTML obtaining unit 102 sends the obtained HTML file to the HTML analyzer 104. The HTML analyzer 104 converts the obtained HTML file into the form displayed on the display unit 105 (Step S23). On the other hand, if the HTML file of the required URL can not be obtained from the WWW server 2, the error process is executed (Step S24). Again, the operational flow becomes in the state of waiting for a request from a user.

The HTML analyzer 104 converts the HTML file into the form displayed on the display unit 105 (Step S23) to send to the display unit 105. The display unit 105 receives the data into which converted by the HTML analyzer 104 to display (Step S25).

The user can browse a desired HTML file through the above-mentioned processing steps. The repetition of the above-mentioned processes enables the browsing history of the user to be accumulated in the history memory 107.

A case will be described below in which a user sets, by operating the input unit 101, that the automatically requiring unit 108 automatically downloads an HTML file. FIG. 3 is the flowchart showing this processing procedure.

At the time set through the input unit 101 by the user, or if the radio state monitor 110 judges that the excellent state of a communication path continues for a while, the automatically requiring unit 108 refers to the browsing history of the user stored in the history memory 107, and then selects several URLs which the user frequently browses to assign priorities to the selected URLs (Step S30).

The selecting method in this case may select, for example, URLs which the user browses in succession for some days, URLs which the user constantly browses for some weeks, or URLs which the user collectively browses for several days.

Then, the automatically requiring unit 108, as necessary, requires the communication establishing unit 109 to establish the communication path, and then waits for the reception of the report of the establishment from the communication establishing unit 109. The automatically requiring unit 108 requires the HTML obtaining unit 102 to obtain the selected URL in order starting from the highest priority (Step S31).

The HTML obtaining unit 102 checks or judges whether or not the HTML file of the URL required by the automatically requiring unit 108 is stored in the HTML memory 103 (Step S32). If it is stored, the HTML obtaining unit 102 checks the date and time of creation of the stored HTML file (Step S33). The HTML obtaining unit 102 requires the WWW server 2 to send an HTML file of a date and time newer than the checked date and time to the HTML obtaining unit 102 if the WWW server 2 has the HTML file of the date and time newer than the checked date and time (Step S34).

If the HTML obtaining unit 102 can obtain the HTML file of the required URL (Step S35) and can also obtain the HTML file of the date and time newer than the checked date and time from the WWW server 2 (Step S36), the HTML obtaining unit 102 stores the obtained new HTML file together with the date and time of the creation of the obtained new HTML file in the HTML memory 103 (Step S37). The HTML obtaining unit 102 reports the completion of the process for the required URL to the automatically requiring unit 108 (Step S42). Then, the operational flow returns back to the process at the step S31.

If the HTML file can not be obtained at the step S35, the error process is executed (Step S41), and the operational flow returns back to the process at the step S31. If The HTML obtaining unit 102 judges at the step S32 that the HTML file of the URL required by the automatically requiring unit 108 is not stored in the HTML memory 103, the HTML obtaining unit 102 requires the WWW server 2 to send the HTML file of the required URL to the HTML obtaining unit 102 without reservation (Step S38).

When the HTML obtaining unit 102 can obtain the HTML file of the required URL from the WWW server 2 (Step S39 ; Yes), the HTML obtaining unit 102 stores the obtained HTML file together with the date and time of the creation of the obtained HTML file in the HTML memory 103 (Step S40). The HTML obtaining unit 102 reports the completion of the above-mentioned operations to the automatically requiring unit 108 (Step S42).

If the HTML file of the required URL is not obtained (Step S39 ; NO), the error process is executed, and the report of the failure of the work is reported to the automatically requiring unit 108 (Step S41). When the automatically requiring unit 108 receives the report of the completion or the failure of the work, the automatically requiring unit 108 requires the HTML obtaining unit 102 to obtain an HTML file having the next highest priority (Step S31).

This is repeated until the selected URL becomes zero, or until it reaches the limit set by the user.

Figure 4:
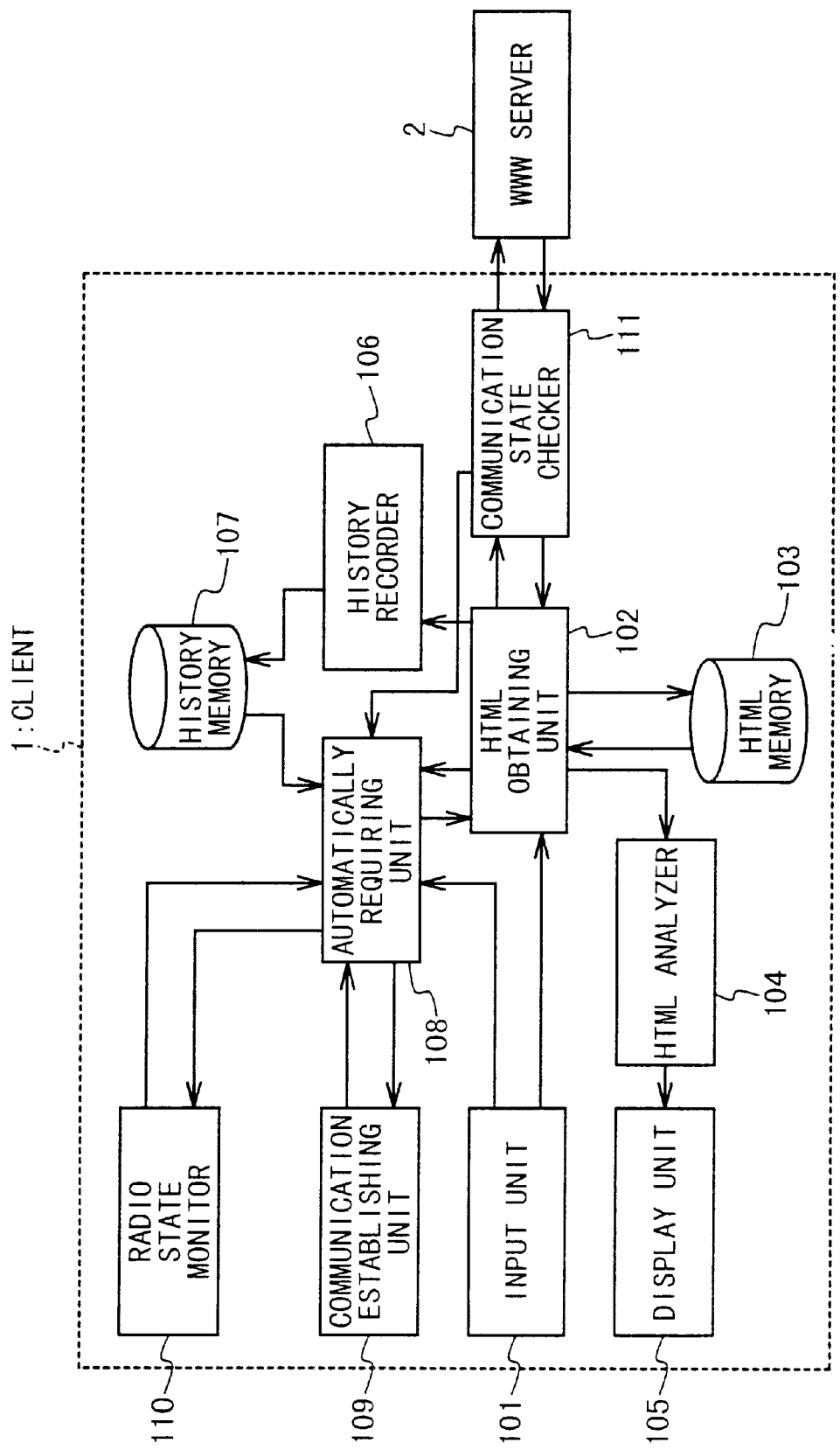
FIG. 4 is a view showing a configuration of a second embodiment of the present invention.

A second embodiment of the present invention will be described below. FIG. 4 is a view showing the configuration of the second embodiment of the present invention.

Referring to FIG. 4, in the second embodiment of the present invention, the client 1 is provided with a communication state checker 111 between the HTML obtaining unit 102 and the WWW server 2, in addition to the configuration of the first embodiment.

The communication state checker 111 monitors or checks a communication state between the HTML obtaining unit 102 and the WWW server 2, a throughput and the like. The monitored result is sent to the automatically requiring unit 108.

In the second embodiment of the present invention, in addition to the time set by the user and the excellent state of the radio wave, even if the communication state checker 111 judges that a margin exists in the communication band between the HTML obtaining unit 102 and the WWW server 2 while the user browses the HTML file on the WWW, an automatically requiring unit 108 refers to a browsing history of the user stored in the history memory 107, selects several URLs which the user frequently browses, assigns priorities to the selected URLs and requires the HTML obtaining unit 102 to obtain an HTML file of a URL having the higher priority.

The HTML obtaining unit 102 obtains the HTML file of the URL required by the automatically requiring unit 108, in addition to a request from a user through the input unit 101, and stores it in the HTML memory 103.

If an accounting manner of using a communication line from the client 1 to the WWW server 2 is done at a unit of a time, the occurrence of a non-used communication band is not desirable for the user. According to the second embodiment of the present invention, the non-used communication band is used to download the HTML file of the URL which the user frequently browses. Thus, if it is obtained, a waiting time of the user can be made shorter, and a cost of a communication can be also reduced.

A third embodiment of the present invention will be described below. In the third embodiment, the history memory 107 records therein a time that elapsed before a user requires a next request, in addition to a URL required by the user and the required date and time.

Typically, a user, when browsing an HTML file that the user takes interest, reads even a part of the HTML file while spending much time. That results in a tendency of making the time used to browse the HTML file that the user takes interest longer. The taste of the user can be precisely attained if the above-mentioned tendency is used to determine the URL to be automatically required.

In a fourth embodiment of the present invention, the history memory 107 records therein the number of characters in a HTML file of a URL required by a user, in addition to the URL required by the user, the required date and time and a time that elapsed before the user requires the next request. In the third embodiment of the present invention, there may be a case that it takes a long time before the user requires the next request merely because of the large number of characters in the HTML file of the URL required by the user, since the number of characters is not considered.

In order to cancel out this problem, the fourth embodiment uses a time used for each character when determining the URL to be automatically required. Here, the number of characters basically implies the number of characters actually displayed on a screen of the display unit 105. If an image is quoted in a HTML file, a size of the image file is divided into a unit size to be converted into the number of characters. This unit size is set for each used bit number per pixel of the image.

In a fifth embodiment of the present invention, the history memory 107 stores therein an update record with regard to a HTML file of a URL required by a user, in addition to the URL required by the user and the required date and time.

As has been discussed, the HTML obtaining unit 102 checks or judges whether or not the HTML file of the URL required is stored in the HTML memory 103 (Steps S12, S32). If it is stored, the HTML obtaining unit 102 checks the date and time of creation of the stored HTML file (Steps S13, S33). The HTML obtaining unit 102 requires the WWW server 2 to send an HTML file of a date and time newer than the checked date and time to the HTML obtaining unit 102 if the WWW server 2 has the HTML file of the date and time newer than the checked date and time (Steps S14, S34).

That is to say, if the HTML file of the URL required is stored in the HTML memory 103, the HTML obtaining unit 102 requires the WWW server 2 to send the HTML file only in the updated case. If the HTML file is sent to HTML obtaining unit 102, this implies that the HTML file of the URL is updated.

An information indicative of the update is sent to the history memory 107 to be stored, in addition to the required URL and the required date and time. If a HTML file of a URL is frequently obtained, an interval between the updates of this HTML file is approximately known.

When the URL is determined to be automatically required, the interval between the updates is considered so as not to require the HTML file of the URL in which the update is not expected. Thus, a useless download can be avoided. Also in a case of an elapse of an update period of a HTML file of a URL, the HTML file of the URL is automatically downloaded even though the user does not access the URL recently. Thus, the URL is determined in higher level to be automatically required.

In a sixth embodiment of the present invention, the URL to be automatically required is determined in accordance with a day of the week when the download is automatically done.

At first, an evaluation value h is determined for each URL included in the history memory 107. In a case of the evaluation value h with regard to a certain URL, if the URL is browsed n times for previously N months (N≈3), the automatically requiring unit 108 searches for a day on which the URL is browsed of a week corresponding to each time of the n times. A difference is detected between the searched day and the day of the week when the download is automatically done. For example, if a day when the download is automatically done is Sunday and another day when a certain URL is browsed is Saturday, a difference between both the days is 6.

Let us suppose that the detected difference of each of the n times is w1, w2, . . . , wn. The evaluation value h at this time is represented as follows:

$$h=f(w1)+f(w2)+\ldots+f(wn).$$

Figure 5:
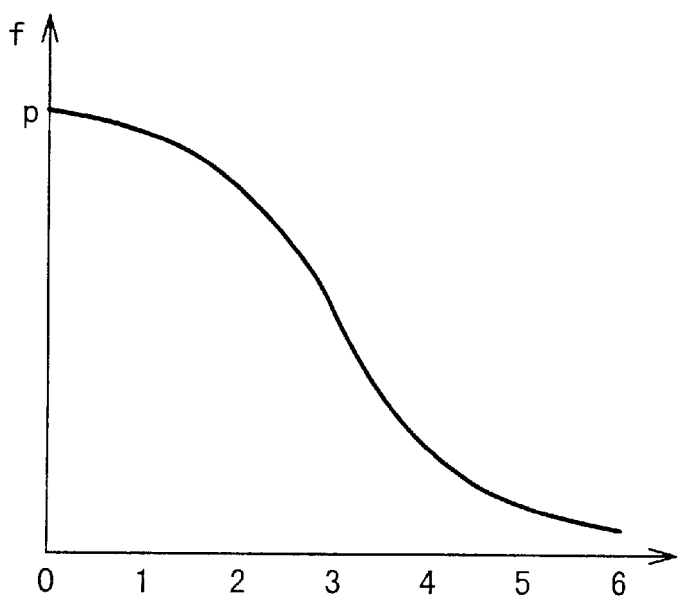
FIG. 5 is a view explaining a sixth embodiment of the present invention.

For example, a normal distribution function shown in FIG. 5 may be considered when the f is a function in which the difference is used as an argument.

The evaluation value h is searched for each URL. Then, several URLs are downloaded in an order starting from a URL having the greater evaluation value h. In addition, if it is not automatically downloaded everyday, the days which are not successive in the week may be evaluated at the same time.

In a seventh embodiment of the present invention, priorities to URLs are determined in accordance with a frequency when each of the URLs is downloaded.

At first, an evaluation value h is calculated for each URL included in the history memory 107. When the evaluation value h is calculated in this embodiment, if an URL is assumed to be browsed n times, the number of days elapsed between a present day and the day on which the browsing is done corresponding to each of the n times is calculated for the URL. As a result, if the respective numbers are d1, d2, . . . , dn, the evaluation value h is represented as follows:

$$h=g(d1)+g(d2)+\ldots+g(dn).$$

Figure 6:
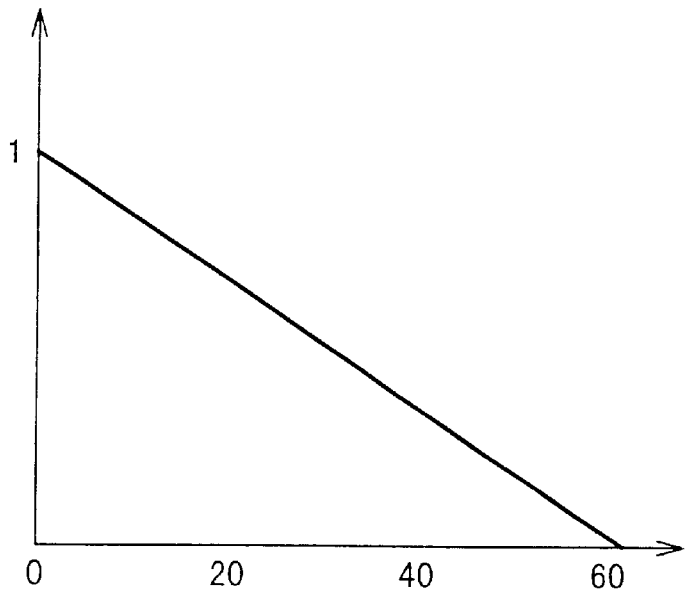
FIG. 6 is a view explaining a seventh embodiment of the present invention.

Here, g is a function with the number of days as an argument. It is desired to be a mere reduction function as shown in FIG. 6. If this embodiment is used, the higher priority is assigned to the URL which is recently frequently browsed.

As mentioned above, the present invention can provide the following effects.

The first effect of the present invention lies in that a preset instruction of URL for which a user desires the automatic download is unnecessary to thereby reduce a burden on the user.

This reason is as follows. That is, the present invention is designed such that the user's previous browsing history with regard to the HTML file is kept. The URL frequently browsed by the user, namely, the URL satisfying the user's taste is automatically searched based on this browsing history.

What is claimed is:

1. An information gathering apparatus, comprising:
 a history memory unit which stores a plurality of URLs and a browsing history data;
 an assigning unit which assigns priorities to said plurality of URLs based on said browsing history data;
 a requiring unit which generates a request to obtain an HTML file corresponding to a particular one of said URLs based on a priority assigned by said assigning unit;
 an HTML obtaining unit which obtains said HTML file from a WWW server in response to said request;
 wherein said history memory unit stores as said browsing history data a period data indicating a time that elapsed after a first URL of said plurality of URLs is specified until a second URL is specified subsequent to said first URL.

2. An information gathering apparatus according to claim 1, wherein said history memory unit stores as said browsing history data a number indicating the number of characters in corresponding HTML files of each of said plurality of URLs.

3. An information gathering apparatus, comprising:
 a history memory unit which stores a plurality of URLs and a browsing history data;
 an assigning unit which assigns priorities to said plurality of URLs based on said browsing history data;
 a requiring unit which generates a request to obtain an HTML file corresponding to a particular one of said URLs based on a priority assigned by said assigning unit;
 an HTML obtaining unit which obtains said HTML file from a WWW server in response to said request;
 wherein said history memory unit stores as said browsing history data a time data indicating a date and time when each of said plurality of URLs is specified; and
 wherein said history memory unit stores as said browsing history data an update time data indicating a time that elapsed before each corresponding HTML file of each of said plurality of URLs is updated.

4. An information gathering apparatus, comprising:
 a history memory unit which stores a plurality of URLs and a browsing history data;
 an assigning unit which assigns priorities to said plurality of URLs based on said browsing history data;
 a requiring unit which generates a request to obtain an HTML file corresponding to a particular one of said URLs based on a priority assigned by said assigning unit;
 an HTML obtaining unit which obtains said HTML file from a WWW server in response to said request;

wherein said requiring unit generates said request at a defined time automatically;

and wherein if each of said plurality of URLs is browsed n (n is a positive integer) times, said assigning unit searches for a day of a week on which each URL is browsed each of said n times and detects a difference period indicating a difference between said searched day and a day corresponding to said defined time, and determines a corresponding evaluation value for each URL based on said difference periods, and assigns the priorities based on the evaluation values.

5. An information gathering apparatus, comprising:

a history memory unit which stores a plurality of URLs and a browsing history data;

an assigning unit which assigns priorities to said plurality of URLs based on said browsing history data;

a requiring unit which generates a request to obtain an HTML file corresponding to a particular one of said URLs based on a priority assigned by said assigning unit;

an HTML obtaining unit which obtains said HTML file from a WWW server in response to said request;

wherein said history memory unit stores as said browsing history data a time data indicating a date and time when each of said plurality of URLs is specified; and wherein if each of said plurality of specific URL data is browsed m (m is a positive integer) times, said assigning unit detects a difference time indicating a difference between a present time and a time corresponding to said time data each of said m times and determines a corresponding evaluation value for each URL based on said difference times, and assigns the priorities based on the evaluation values.

6. An information gathering method, comprising:

storing a plurality of URLs and a browsing history data;

assigning priorities to said plurality of URLs based on said browsing history data;

generating a request to obtain an HTML file corresponding to a particular one of said URLs based on a priority assigned by said assigning;

obtaining said HTML file corresponding to said request in response to said request;

wherein said storing step includes storing as said browsing history data a period data indicating a time that elapsed after a first URL of said plurality of URLs is specified until a second URL is specified subsequent to said first URL.

7. An information gathering method according to claim 6, wherein said storing step includes storing as said browsing history data a number indicating the number of characters in corresponding HTML files of each of said plurality of URLs.

8. An information gathering method comprising:

storing a plurality of URLs and a browsing history data;

assigning priorities to said plurality of URLs based on said browsing history data;

generating a request to obtain an HTML file corresponding to a particular one of said URLs based on a priority assigned by said assigning;

obtaining said HTML file corresponding to said request in response to said request;

wherein said storing step includes storing as said browsing history data a time data indicating a date and time when each of said plurality of URLs is specified;

wherein said storing step includes storing as said browsing history data an update time data indicating a time that elapsed before each corresponding HTML file of each of said plurality of URLs is updated.

9. An information gathering method comprising:

storing a plurality of URLs and a browsing history data;

assigning priorities to said plurality of URLs based on said browsing history data;

generating a request to obtain an HTML file corresponding to a particular one of said URLs based on a priority assigned by said assigning;

obtaining said HTML file corresponding to said request in response to said request;

wherein said generating step includes generating said request at a defined time automatically; and wherein if each of said plurality of URLS is browsed n (n is a positive integer) times, said assigning step includes searching for a day of a week on which each URL is browsed each of said n times and detecting a difference period indicating a difference between said searched day and a day corresponding to said defined time and determining a corresponding evaluation value for each URL based on said difference periods, and assigning the priorities based on the evaluation values.

10. An information gathering method comprising:

storing a plurality of URLs and a browsing history data;

assigning priorities to said plurality of URLs based on said browsing history data;

generating a request to obtain an HTML file corresponding to a particular one of said URLs based on a priority assigned by said assigning;

obtaining said HTML file corresponding to said request in response to said request;

wherein said storing step includes storing as said browsing history data a time data indicating a date and time when each of said plurality of URLs is specified;

wherein if each of said plurality of specific URL data is browsed m (m is a positive integer) times, said assigning step includes detecting a difference time indicating a difference between a present time and a time corresponding to said time data each of said m times and determining a corresponding evaluation value for each URL based on said difference times, and assigning the priorities based on the evaluation values.

* * * * *